Sept. 11, 1923.
R. C. McCLAY
COMBINED REAMER AND POLISHER
Filed Aug. 17, 1921
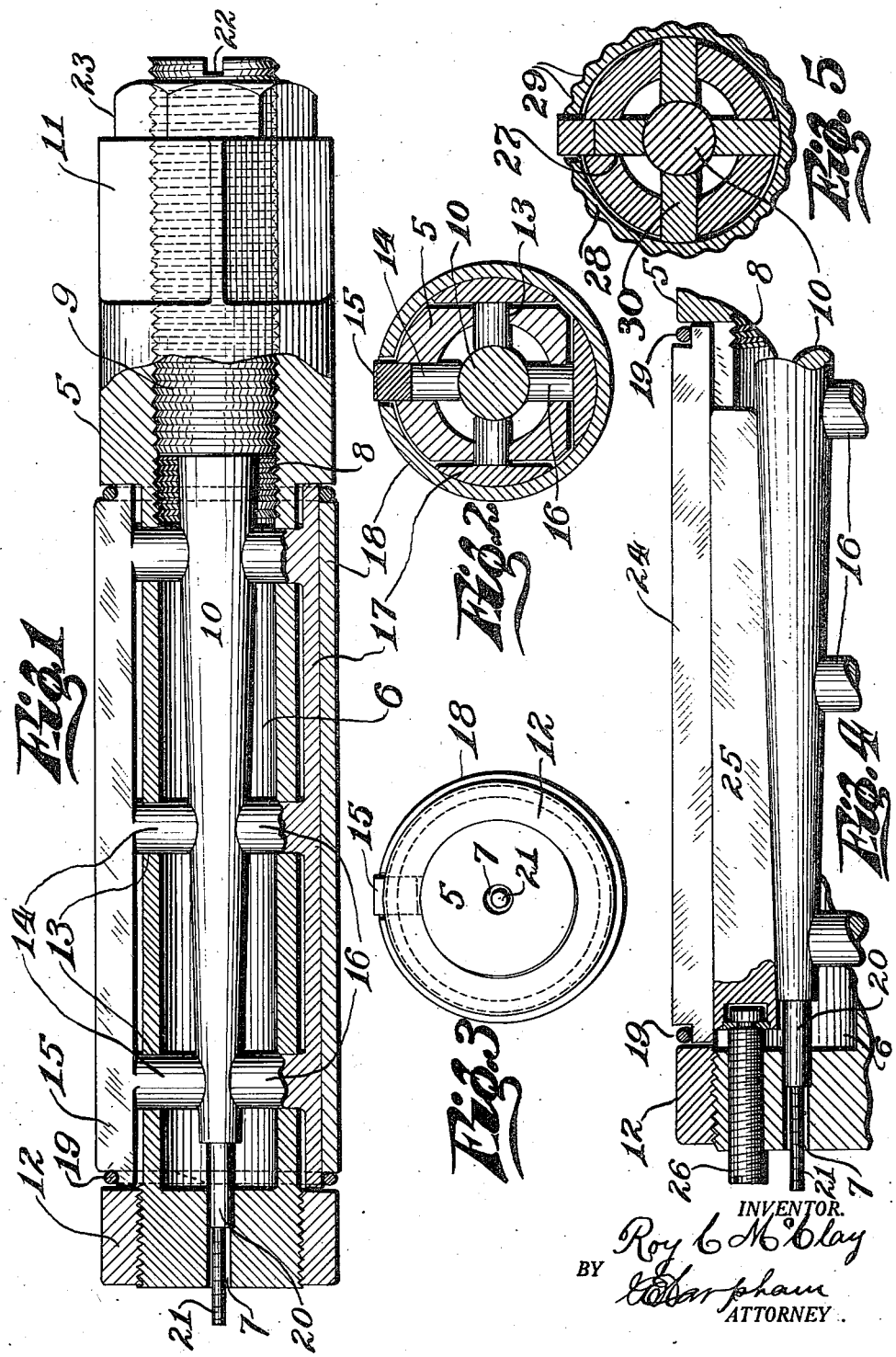

Patented Sept. 11, 1923.

1,467,977

UNITED STATES PATENT OFFICE.

ROY C. McCLAY, OF LOS ANGELES, CALIFORNIA, ASSIGNOR OF ONE-HALF TO WILLIAM H. MYERS, OF LOS ANGELES, CALIFORNIA.

COMBINED REAMER AND POLISHER.

Application filed August 17, 1921. Serial No. 492,986.

*To all whom it may concern:*

Be it known that I, ROY C. McCLAY, a citizen of the United States, residing at the city of Los Angeles, county of Los Angeles, State of California, have invented new and useful Improvements in a Combined Reamer and Polisher, of which the following is a specification.

My invention relates primarily to a tool for hand use in reaming and polishing bearings for crank shafts, or other bearings, although it may be used for other purposes and may be used in lathes or other machines.

The object of my invention is to provide a tool that will enlarge a hole previously bored and at the same time will polish the sides of the hole. A further object is to provide a tool that can be adjusted to ream and polish holes of different sizes.

In the drawings forming a part of this application, Fig. 1 is a central longitudinal section of certain of the parts of my tool and a side elevation of other parts thereof. Fig. 2, is a cross section on a line through the cutter blade near its center. Fig. 3 is an end view looking to the right. Fig. 4 a fragmentary portion partly in section and partly in side elevation of a slight modification of my tool. Fig. 5 is a cross-section of another modification.

Referring to the drawings, 5 is the mandrel which has a central bore therein. The main portion 6 of this bore is larger than outer end 7 and is internally threaded a portion of its depth as at 8 for the reception of the threaded head 9 of the tapered expander body 10. Surrounding this threaded portion, the mandrel is larger than in its other parts and a portion of the external surface is square in cross section for insertion in a brace and the adjacent portion is circular in cross section to act as a guide. This larger portion I will call the mandrel head 11. Surrounding the bore 7 the mandrel is externally circular and threaded for the reception of nut 12. The portion between nut 12 and head 11 will be called the mandrel body. At spaced distances apart the mandrel body has transverse holes 13 therein for the passage therethrough of pins 14 of the reaming blade 15 and of pins 16 of the expander bars 17. These expander bars are preferably in shape of a segment of a cylinder as best shown in Fig. 2. A polishing jacket 18 surrounds bars 17 and abuts against the sides of blade 15 and holds the bars positioned. The ends of blade 15 are notched for the reception of the split retaining rings 19 which pass over the ends of the blade and hold it from slipping out of the tool when not in use. The outer end 20 of the expander is cylindrical and passes into bore 7. A scale rod 21 is mounted in end 20 and indicates the distance the expander moves when it is rotated. A kerf 22 provides means for the use of a screw driver to rotate the expander. A lock nut 23 holds the expander in its adjusted position. In the modified form shown in Fig. 4 the construction is the same as in the preferred form except that the reaming blade 24 has no pins and lies in a slot cut longitudinally in the mandrel body. In the place of the pins I use a tapered wedge 25 which can be independently operated by a screw 26 which passes in threaded contact through a hole in the end of the mandrel and is revoluble in the end of the wedge. In this modified form I can adjust the blade without changing the jacket. In Fig. 5, I have shown another modification. In this form the expander bars 30 extend through slots 27 and abut against body 10. The outer surface of the polishing jacket 28 is provided with longitudinal grooves 29. The blade and its expanding wedge and regulating screw are the same as in Fig. 4.

By this construction it will be seen that I can both ream out a previously bored hole in iron and at the same time polish the sides thereof. The blade and expander pins could be separated.

Having described my invention I claim—

1. A reamer and polisher comprising a hollow mandrel having transverse holes therein, said mandrel being interiorly threaded in a portion of its bore, said threaded portion being at the head thereof and expander having a tapered body and a threaded head, said head engaging the threads of the mandrel, a reaming blade having pins projecting through the transverse holes in the mandrel; expander bars having pins projecting through the transverse holes in the mandrel; and a jacket surrounding said expander bars and contacting with the sides of the reaming blade.

2. A reamer and polisher comprising a hollow mandrel; a reaming blade and expander bars mounted in said mandrel; a jacket surrounding the expander bars; and means within the mandrel to expand the blade and bars.

3. In a combination reamer and polisher the combination of a mandrel; a reaming blade and expander bars mounted in said mandrel; a jacket surrounding said bars and abutting against said blade; expanding means adjustably mounted within said mandrel, whereby the position of the blade and bars and jacket may be changed relative to said mandrel; and a scale carried by said expanding means.

In witness that I claim the foregoing I have hereunto subscribed my name this 3rd day of August, 1921.

ROY C. McCLAY.